Feb. 14, 1950

E. D. SCOTT ET AL 2,497,276

WINDOW CONSTRUCTION

Filed April 3, 1946

E. D. SCOTT
T. W. STEPHENSON
INVENTORS.

BY
C. C. McRae
R. G. Harris
J. R. Faulkner
T. H. Oster

ATTORNEYS.

Patented Feb. 14, 1950

2,497,276

UNITED STATES PATENT OFFICE 2,497,276

WINDOW CONSTRUCTION

Edwin D. Scott, Plymouth, and Thomas W. Stephenson, Detroit, Mich., assignors to Ford Motor Company, Dearborn, Mich., a corporation of Delaware Application April 3, 1946, Serial No. 659,262

4 Claims. (Cl. 296—44)

1

This invention relates generally to a window construction, and has particular reference to the construction of a fixed window for a vehicle.

Present day motor vehicles have a number of windows which can be opened for ventilation purposes, and in addition have a number of fixed windows, such as the rear window, windshield, and the rear quarter windows. In designing fixed window installations for motor vehicles, several requirements must be met. The window must be waterproof, or in other words, must be so mounted that air and water cannot enter between the marginal edges of the window glass and the vehicle body. With the present tendency toward designing automobile bodies so that the rear window and windshield are considerably inclined from the vertical, the problem of adequately sealing the window against the weather is aggravated. Another requirement is that the joint between the window glass and the body must present a pleasing and trim appearance, when viewed from both the exterior and the interior of the car. In addition, the component parts of the window assembly must be easily and inexpensively manufactured, and must lend themselves to simple and rapid assembly.

Various constructions have heretofore been used for mounting a fixed window glass upon a motor vehicle body, including rubber sealing strips so preformed that when the strip is assembled in the window opening and with the window glass, portions thereof are stretched from their original positions, thus tending to maintain tight sealing engagement with the body and the glass. It has been found, however, that after aging and long exposure to the weather, the rubber is apt to lose part of its resiliency and leaks may result.

The present construction obtains improved sealing characteristics by using not only the resiliency of the weather stripping material to provide a weather tight joint between the window glass and the body, but by also employing a retainer tightened against the sealing strip by screws. The resilient sealing strip and the retainer are of such cross sectional configuration that they cooperate with each other and with the window frame to cause the rubber sealing strip to be clamped tightly against both the window glass and the window frame when the retainer is drawn toward the window frame by tightening the screws. In addition, the sealing strip is so formed as to facilitate the assembly of the window glass therewith without detracting from the sealing properties of the assembly. This constitutes an important improvement over previous constructions, in which the assembly of the window glass in the weather stripping was rendered difficult by reason of the necessity for sealing the window by the resiliency of the sealing strip alone.

Another advantage of the present construction is that it readily lends itself to the attachment of a decorative molding strip, thus providing an improved appearance. This is accomplished by forming the marginal edges of the retainer so as to receive the rolled edges of a molding strip which can be easily assembled thereto simply by snapping the latter in place upon the retainer. Thus, no additional mounting means for the molding strip are required.

Still another advantage is the fact that the window construction of the present invention also functions to hold in place the fabric or trim material which covers the interior of the roof of the vehicle. To obtain an attractive appearance, it is essential that the trim fabric be stretched fairly tight, and it has been difficult to properly secure the edges thereof adjacent the window opening to maintain this tightness. With the present construction, the edges of the fabric are clamped between the window frame and the rubber sealing strip. Since the sealing strip is placed under compression by the retainer, this arrangement is extremely effective in properly securing the trim fabric in place.

A further object of the invention is to provide a construction in which the window glass is assembled into the window frame from outside the vehicle, rather than being inserted from the inside as in conventional practice; and in which the window glass is more nearly flush with the outer surface of the adjacent body panel to present a more pleasing appearance.

Other objects and advantages of this invention will be made more apparent as this description proceeds, particularly when considered in connection with the accompanying drawings, in which.

Figure 1:
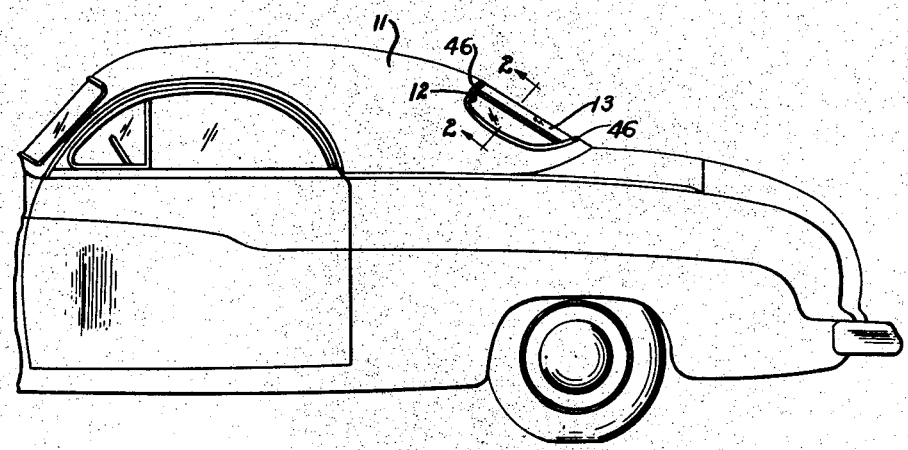
Figure 1 is a fragmentary side elevational view of a motor vehicle embodying the window construction of the present invention.

Referring now more particularly to the drawings, there is shown in Figure 1 a motor vehicle having a roof panel 11 provided with a window opening 12, in which is mounted a window glass 13. In accordance with present trends in body styling, the rear window 13 is inclined substantially from the vertical, and thus is required to be efficiently sealed to prevent leakage of water between the marginal edges of the window glass and the roof.

Figure 2:
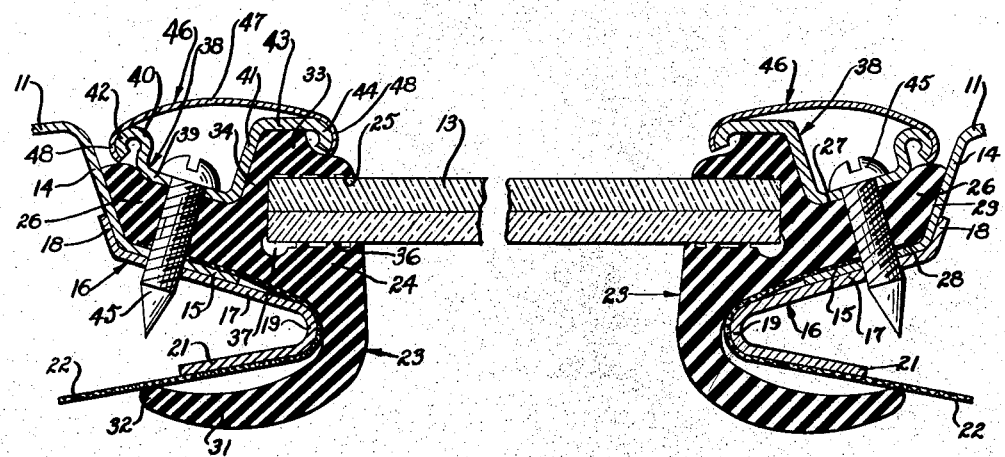
Figure 2 is a cross sectional view taken substantially on the plane indicated by the line 2—2 of Figure 1.

As best seen in Figure 2, the roof panel 11 is depressed inwardly adjacent the window opening 12 to form a wall 14 which extends toward the interior of the vehicle body at a considerable angle with the plane of the window opening. Forming an extension of the wall 14 is a marginal flange 15 which also extends toward the interior of the vehicle body, but at a smaller angle with the plane of the window opening.

A window frame, indicated generally at 16, is secured to the wall 14 and flange 15 of the roof panel, preferably by spot welding thereto. The window frame 16 has a straight body portion 17 positioned adjacent the flange 15 of the roof panel and extending a distance inwardly therefrom to form a continuation thereof. The outer end of the body portion 17 of the frame is bent outwardly to form a flange 18 adjacent the wall 14 of the roof panel. At the inner edge of the body portion 17, the frame is bent inwardly to form a curved portion 19 which continues into a straight flange 21 angularly disposed with respect to the body portion 17.

Fabric or trim material 22 is used to upholster the interior of the roof panel 11, in accordance with conventional practice, and adjacent the window opening 12 is cut in such a manner as to provide sufficient margin for folding the fabric around the window frame 16 and the marginal flange 15 of the roof panel. To assist in retaining the trim fabric in place, the latter is cemented to the window frame 16 and the flange 15.

In assemblying the window unit, the resilient sealing strip 23, which is preferably formed of rubber, is first assembled to the window frame 16. The sealing strip 23 comprises a body portion 24 which is formed with a groove 25 extending completely around its inner periphery for receiving the marginal edge portions of the window glass 13. Radially outwardly from the body portion 24 in the plane of the window glass, the sealing strip is formed with a relatively thick flange 26, the upper and lower surfaces 27 and 28 of which are slightly inclined with respect to the plane of the window glass, being parallel to the marginal flange 15 of the roof panel. The thick flange 26 terminates in an inclined outer surface 29 parallel with the wall 14 of the roof panel.

Extending toward the interior of the vehicle from the body portion 24 of the sealing strip is a flexible curved flange 31 which not only provides the appearance of a molding strip from the interior of the vehicle but assists in maintaining the fabric 22 taut by engagement of the outer tip 32 of the curved flange 31 with the fabric.

It will be noted that the portion 33 of the sealing strip positioned outwardly of the vehicle body from the groove 25 is joined to the body portion 24 by means of a narrow neck 34. This narrow neck portion 34 serves in the nature of a hinge to permit the portion 33 of the sealing strip to be temporarily forced outwardly to permit the window glass 13 to be inserted in the groove 25.

Figure 3:
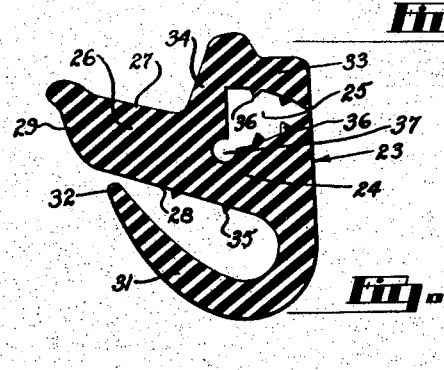
Figure 3 is a cross sectional view through the sealing strip shown in Figure 2, but illustrating the latter in its original position before assembly.

Attention is now invited to Figure 3 in which the sealing strip 23 is shown in its original position before assembly with the window frame and the window glass. It will be noticed that the original unflexed sealing strip differs materially in cross sectional configuration from its shape after assembly. For example, the flexible curved flange 31 normally is positioned with its tip 32 closely adjacent the thick flange 26 of the sealing strip, so that to assemble the sealing strip around the window frame 16 it is necessary to flex the curved flange 31 outwardly to the position shown in Figure 2. This tensions the rubber in the curved flange 31 and assists in resiliently holding the sealing strip around the window frame. The tip 32 of the curved flange 31 engages the fabric 22 and helps to maintain the latter taut. It will also be noted in Figure 3 that the lower surface 28 of the thick flange 26 of the sealing strip is formed with a pair of pointed ribs 35 which flatten when subjected to the pressure of the assembly but maintain local areas of increased pressure, helping to retain the trim fabric 22 in position upon the marginal flange 15 of the roof panel and the window frame 16.

It will be seen from Figure 3 that the groove 25 in the body portion 24 of the sealing strip is initially generally V-shaped so that the opposite sides thereof must be forced apart when the window glass 13 is inserted therein. The inherent resiliency of the rubber thus assists in maintaining a tight seal between the sealing strip and the glass. In addition, the sides of the groove 25 are formed with pointed ribs 36 which become partially flattened after the window glass is inserted, and maintain areas of pressurized contact between the sealing strip and the glass. A semi-cylindrical groove 37 is formed in the bottom of the groove 25 to improve the flexing qualities of the strip. As mentioned above, the narrow neck portion 34 permits the outer portion 33 of the sealing strip to be readily flexed outwardly to permit the window glass 13 to be inserted, but inasmuch as the outer portion 33 and the body portion 24 are distorted from the original position by the insertion of the window glass therebetween, the rubber exerts pressure on opposite sides of the glass and functions to provide a seal therebetween.

Although the inherent resiliency of the rubber sealing strip, when distorted to the assembled position shown in Figure 2, is effective to provide a seal between the window glass and the window frame and roof panel, the present invention employs additional means to improve this seal and to render the window construction absolutely weather-proof and watertight. A retainer 38 is positioned adjacent the outboard side of the sealing strip 23 and extends completely around the window opening. In cross section, the retainer 38 is generally U-shaped, having a base 39 and side flanges 40 and 41. The side flange 40 terminates in a rolled edge or bead 42, whereas the wider side flange 41 continues into an outer flange 43 which is generally parallel with the window glass 13. The marginal edge of the outer flange 43 is rolled to form a bead 44.

At spaced intervals the base 39 of the retainer 38 is apertured for the passage therethrough of screws 45 which are threaded into tapped holes in the marginal flange 15 of the roof panel and the body portion 17 of the window frame. It will be apparent that upon tightening the screws 45 the retainer 38 is drawn toward the flange 15 and the window frame 16, compressing the thick flange 26 of the sealing strip therebetween. This is effective to force the rubber lengthwise of the thick flange 26 into tight wedging engagement with the wall 14 of the roof panel and the outer marginal edge of the window glass. In addition, the outer flange 43 of the retainer is forced toward the window glass 13, resulting in placing the outer portion 33 of the sealing strip under compression and into firm sealing engagement with the glass. Simultaneously, the body portion 24 of the sealing strip is compressed between the window frame 16 and the window glass 13.

In order to provide a pleasing apparance to the window assembly when viewed from the exterior of the vehicle, a decorative molding strip 46, which is preferably formed of thin gauge metal and is chrome plated, is assembled to the retainer 37 in such a manner as to completely conceal the latter. As best seen in Figure 2, the central portion 47 of the molding strip 46 is slightly rounded, and the opposite edges thereof are bent inwardly to form curved portions 48 which engage the beads 42 and 44 provided on opposite edges of the retainer 38. Due to the inherent flexibility of the central curved portion 47, the molding strip 46 can readily be snapped onto the retainer 38 without the necessity of providing any additional mounting or attaching means. It will be seen that the molding strip 46 not only completely conceals the retainer 38 from view, but also substantially covers the exterior portion of the sealing strip 23, thus providing a trim outside appearance for the window assembly.

Inasmuch as the window assembly utilizes both the resiliency of the distorted sealing strip 23 and the clamping action of the retainer 38 to provide a seal between the window glass and the window frame, it is unlikely that leaks will ever develop. If necessary, however, it is a simple matter to tighten the screws 45 to increase the pressure upon the sealing strip should any leaks occur. This can readily be accomplished simply by removing the molding strip 46.

It will further be apparent that the pressure exerted by the sealing strip 23 upon that portion of the trim fabric 22 which overlies the flange 15 of the roof panel and the body portion 17 of the window frame, is sufficient to prevent any loosening of the fabric, thus effectively maintaining the latter in its original taut position.

Attention is directed to the fact that the window glass 13 is assembled in the window frame by inserting the glass from the outside, rather than from the inside as is conventionally done. With the present trend toward larger rear windows and with the limited space available for assembly the glass from the inside, this construction lends itself to simpler and faster assembly, and in addition makes it possible to arrange the window glass so that it is more nearly flush with the marginal edges of the roof panel at the window opening. This will be apparent from an examination of Figure 2, which is enlarged to approximately double the actual size, and which shows the window glass 13 only slightly recessed with respect to the roof panel 11 and the decorative molding strip 46 substantially flush with the roof panel.

It will be understood that the invention is not to be limited to the exact construction shown and described, but that various changes and modifications may be made without departing from the spirit and scope of the invention, as defined in the appended claims.

What is claimed is:

1. In a window construction for a vehicle, a body panel having a window opening formed therein, said body panel having a portion at said window opening extending inwardly at a considerable angle to the plane of said window opening, and a marginal flange extending inwardly from said first-mentioned portion at a smaller angle to the plane of said window opening, said inwardly extending portion and said flange cooperating a form a depressed window frame in said body panel, a resilient sealing strip seated in said window frame in engagement with said flange and said first-mentioned portion, a groove formed in the inner periphery of said sealing strip to receive a window glass, a window glass having its marginal edges seated within said groove, a retaining strip having a base portion extending generally parallel to the marginal flange of said body panel and an outer flange extending generally parallel to and overlying the marginal edges of said window glass, fastening means extending through the base of said retaining strip and engageable with the marginal flange of said body panel to clamp said sealing strip therebetween and to simultaneously clamp said sealing strip against the opposite faces of said window glass, and a decorative molding mounted upon said retaining strip and substantially concealing the latter and said sealing strip.

2. In a window construction for a vehicle, a body panel having a window opening therein, a fixed window glass closing said window opening, a resilient sealing strip having a groove formed in its inner periphery for receiving the marginal edge portions of the bases of said window glass and a substantially wedge shaped body portion between the outer marginal edge of said glass and the wall defining said window opening, and a stepped retainer having a marginal flange engaging the outer face of said sealing strip in the zone of the latter which overlaps the marginal edge portion of said window glass and a depressed portion engaging the outer face of said sealing strip in the zone of said wedge shaped body portion, means clamping said retainer to exert pressure upon said sealing strip in each of said zones, the pressure upon the first zone clamping the opposite faces of said window glass within said groove and the pressure upon the second zone clamping the wedge shaped portion of said sealing strip between the marginal edge of the glass and the adjacent wall of the window opening.

3. In a window construction for a vehicle, a body panel having a window opening therein and a frame defining said window opening and formed with a wall extending at an obtuse angle to the plane of the window opening, a fixed window glass closing said window opening, a resilient sealing strip having spaced portions engaging opposite faces of said window glass adjacent the marginal edges thereof and a substantially wedge shaped portion between the marginal edge of said glass and the inclined wall of said window frame, and a retainer adapted to be secured to said window frame and having a base portion engageable with the wedge shaped portion of said resilient sealing strip to place the latter under compression and expand it into tight sealing engagement between the outer marginal edge of the glass and the inclined wall of said window frame and also having an inner marginal flange extending substantially parallel to said window glass and engageable with one of the portions of said sealing strip overlying the face of the window glass to provide a tight sealing engagement therebetween.

4. In a window construction for a vehicle, a body panel having a window opening formed therein, said body panel having a wall at said window opening extending at an obtuse angle to the plane of the window opening and a marginal flange extending inwardly from said wall at an acute angle to the plane of the window opening to form with said wall a window frame, a resilient sealing strip seated in said window frame in engagement with said wall and said marginal flange, said sealing strip having a groove formed in its inner periphery for receiving a window glass and a surface extending generally parallel to said marginal flange and spaced therefrom, a window glass seated within said groove, and a retainer having a base portion extending generally parallel to said marginal flange and in engagement with the surface of said sealing strip which extends parallel to said flange to compress this portion of the sealing strip and expand it into tight sealing engagement with the marginal edge of the window glass and with the inclined wall of the window frame, said retainer also having a flange overlying the face of said window glass adjacent its marginal edge and engageable with the sealing strip to clamp the latter between the marginal flange of said retaining strip and the marginal flange of said window frame to effect a tight sealing engagement between the window glass and the adjacent spaces of the groove in the sealing strip.

EDWIN D. SCOTT.
THOMAS W. STEPHENSON.

REFERENCES CITED

The following references are of record in the file of this patent:

UNITED STATES PATENTS

| Number | Name | Date |
|---|---|---|
| 1,975,372 | Potter | Oct. 2, 1934 |
| 2,204,769 | Potter | June 18, 1940 |
| 2,233,335 | Axe et al. | Feb. 25, 1941 |
| 2,254,028 | Cheston | Aug. 26, 1941 |
| 2,270,036 | Conlon | Jan. 13, 1942 |
| 2,354,341 | Verhagen | July 25, 1944 |